United States Patent
Dai et al.

(10) Patent No.: US 9,529,176 B2
(45) Date of Patent: Dec. 27, 2016

(54) MICRO-LENSES

(71) Applicant: ZHEJIANG SUNNY OPTICS CO., LTD., Yuyao, Zhejiang Province (CN)

(72) Inventors: Fujian Dai, Yuyao (CN); Lin Huang, Yuyao (CN)

(73) Assignee: Zhejiang Sunny Optics Co., Ltd., Yuyao, Zhejiang Province (CN)

( * ) Notice: Subject to any disclaimer, the term of this patent is extended or adjusted under 35 U.S.C. 154(b) by 0 days.

(21) Appl. No.: 14/116,254

(22) PCT Filed: Nov. 6, 2012

(86) PCT No.: PCT/CN2012/084171
§ 371 (c)(1),
(2) Date: Nov. 7, 2013

(87) PCT Pub. No.: WO2013/185431
PCT Pub. Date: Dec. 19, 2013

(65) Prior Publication Data
US 2015/0109687 A1    Apr. 23, 2015

(30) Foreign Application Priority Data

Jun. 11, 2012 (CN) .......................... 2012 1 0195903
Oct. 24, 2012 (CN) .......................... 2012 1 0412069

(51) Int. Cl.
*G02B 3/02* (2006.01)
*G02B 13/00* (2006.01)
*G02B 9/12* (2006.01)

(52) U.S. Cl.
CPC ............ *G02B 13/0035* (2013.01); *G02B 9/12* (2013.01)

(58) Field of Classification Search
CPC . G02B 13/001; G02B 13/0015; G02B 13/002; G02B 13/0035; G02B 9/12
See application file for complete search history.

(56) References Cited

U.S. PATENT DOCUMENTS

2005/0253952 A1* 11/2005 Minefuji ............ G02B 13/0035
348/335
2006/0291852 A1* 12/2006 Isono ............................ 396/439

FOREIGN PATENT DOCUMENTS

JP      2010-276836      * 12/2010 ............. G02B 13/00

* cited by examiner

Primary Examiner — Joseph P Martinez
(74) Attorney, Agent, or Firm — Studebaker & Brackett PC

(57) ABSTRACT

A micro-lens is provided. The micro-lens includes a first lens, a second lens and a third lens. The first lens is a convexo-convex lens with positive focal power; the second lens is a lens having a concave image-side surface with negative focal power; and the third lens is a lens with negative focal power. At least one surface of the first, second and third lenses is aspheric. The micro-optical lens provided herein employs three pieces of aspheric lens, and breaks through the current patent blockage through distribution of different focal power, and set forth a new solution for the specification and performance as required currently. Meanwhile, the optical lens disclosed in this invention has small size and high optical quality, and thus could be easily installed in various digital products requiring portable imaging.

7 Claims, 7 Drawing Sheets

MICRO-LENSES

TECHNICAL FIELD

The invention relates to an optical imaging system, particularly to a micro-pick up lens consisted with three lenses.

BACKGROUND

With the increasingly demands for portability of optical lenses as well as continuous innovation and change in digital imaging, the imaging devices such as mobile phone, camera, laptop computer tend to miniaturization, so that the lenses for above products shall be small-sized and high light. Also, the good optical quality shall be made available.

SUMMARY

The invention provides an optical lens, which is both small-sized and high-performance.

The optical lens includes a first lens, a second lens and a third lens, and the first lens is a convexo-convex lens with positive focal power; the second lens is a lens having a concave image-side surface with negative focal power; and the third lens is a lens with negative focal power, and the surfaces of the first lens, the second lens and the third lens include at least one aspheric surface.

The optical lens may meet the requirements as below:

$0 < f2/f3 < 1.5$ where f2 is the focal length for the second lens, and f3 is the focal length for the third lens;

$|f3|/f > 2.0$ where |f3| is the absolute value of the focal length for the third lens, and f is the focal length of whole system;

$0.8 < TTL/f < 2.5$ where TTL is the distance from the central point of object side of the first lens to an imaging surface, and f is the focal length of whole system;

A diaphragm is between the first lens and an object or between the first lens and second lens.

In addition, the positions of the first lens, the second lens and the third lens are fixed.

The micro-optical lens provided herein employs three pieces of aspheric lens, so as to break through the current patent blockage through distribution of different focal power. Thus, a new solution is available for the specification and performance as required currently. Also, the micro-optical lens provided herein has small size and high optical quality, and thus can be easily installed in various digital products requiring portable imaging.

DETAILED DESCRIPTION OF THE INVENTION

The optical lens of the present invention will be described in various embodiments.

Figure 1:
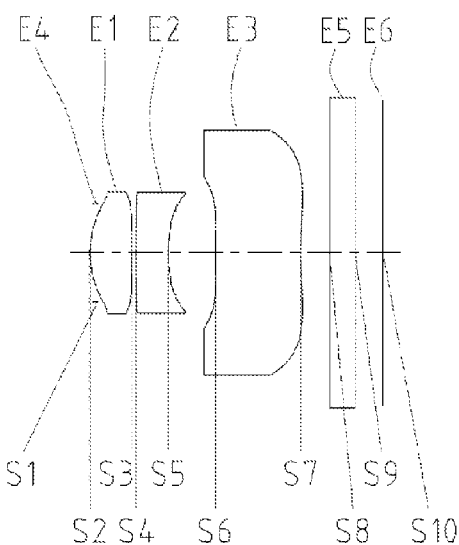
FIG. 1 is a schematic diagram of a micro-lens according to Embodiment 1 of the present invention

Embodiment 1:

In Embodiment 1, it can be seen from FIG. 1, from an object side to an image side, a diaphragm E4, a first lens E1, a second lens E2, a third lens E3, an optical filter E5 and an optical lens E6. The first lens E1 is a convexo-convex lens with positive focal power. The second lens E2 is an image surface undercutting lens with negative focal power (concave surface surfaces the image side). The third lens E3 is a lens with negative power. In addition, at least one surface of the lenses is aspheric. In addition, the optical filter and each of the lenses are fixed and not movable.

The surface of the diaphragm E4 is S1. The two surfaces of the first lens E1 are S2 and S3. The two surfaces of the second lens E2 are S4 and S5. The two surfaces of the third lens E3 are S6 and S7. The two surfaces of the optical filter E5 are S8 and S9. The surface of the optical lens E6 is S10.

TTL=3.444; f1=1.959; f2=−3.589; f3=−17.986; f=3.151

F2/f3=0.200

|f3|/f=5.709

TTL/f=1.093

System parameters: 1/5" stop value of sensor device: 2.8

TABLE 1

| Surface No. | Surface type | Radius of curvature R | Thickness D | Material | Effective diameter D | Cone factor K |
|---|---|---|---|---|---|---|
| Object surface | Spherical surface | Infinity | Infinity | | Infinity | |
| S1 (diaphragm) | Spherical surface | Infinity | −0.1003 | | 1.13 | |
| S2 | Aspheric surface | 1.0903 | 0.5008 | 1.544/56.1 | 1.19 | −0.0489 |
| S3 | Aspheric surface | −48.9486 | 0.0560 | | 1.26 | −8.2475 |
| S4 | Aspheric surface | 8.8196 | 0.3706 | 1.633/23.3 | 1.25 | −79.7420 |
| S5 | Aspheric surface | 1.7908 | 0.5609 | | 1.22 | −41.3176 |
| S6 | Aspheric surface | 17.0869 | 0.9891 | 1.544/56.1 | 1.60 | −149.9227 |
| S7 | Aspheric surface | 6.1122 | 0.0694 | | 2.67 | −150.0476 |
| S8 | Spherical surface | Infinity | 0.3000 | 1.517/64.2 | 2.92 | |
| S9 | Spherical surface | Infinity | 0.5974 | | 3.06 | |
| Image surface | Spherical surface | Infinity | | | 3.49 | |

Table 2 shows the high-order term factors of aspheric surface for the lens with aspheric surface, i.e. A4, A6, A8, A10, A12, A14 and A16:

TABLE 2

| Surface no. | A4 | A6 | A8 | A10 | A12 | A14 | A16 |
|---|---|---|---|---|---|---|---|
| S2 | −2.3131E−02 | −5.4784E−01 | 3.3873E+00 | −1.3392E+01 | 2.0709E+01 | 4.7045E+00 | −4.1158E+01 |
| S3 | −3.0998E−01 | −9.8561E−01 | 1.2135E+01 | −4.4179E+01 | 7.7570E+01 | −1.0638E+02 | 9.5352E+01 |
| S4 | −2.9880E−01 | 1.5121E−01 | 6.1104E+00 | −1.2492E+01 | −1.6789E+01 | 2.6019E+01 | 3.7416E+01 |
| S5 | 7.8612E−01 | −2.0679E+00 | 5.7962E+00 | 3.5856E+00 | −2.5509E+01 | −1.9657E+01 | 9.0112E+01 |
| S6 | −2.5766E−01 | −1.7841E−01 | 3.4525E−01 | −4.3791E−01 | 6.5432E−01 | −2.2832E+00 | 2.2603E+00 |
| S7 | −7.5738E−04 | −1.9442E−01 | 2.2282E−01 | −1.7121E−01 | 7.8327E−02 | −2.0136E−02 | 2.0819E−03 |

Figure 6:
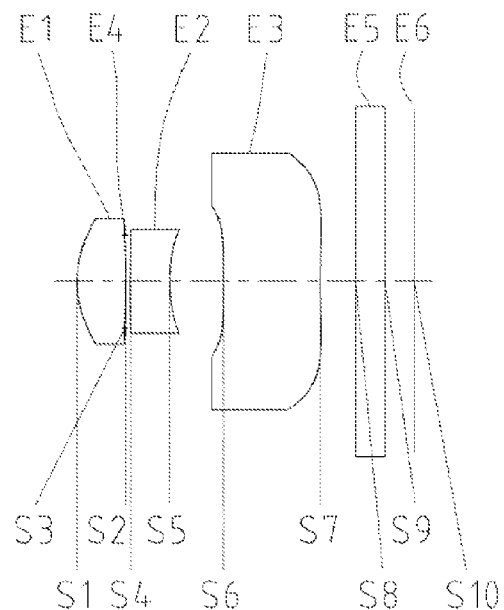
FIG. 6 is a schematic diagram of a micro-lens according to Embodiment 2 of the present invention.

Embodiment 2:

In Embodiment 2, it can be seen from FIG. 6, from an object side to an image side, a first lens E1, a diaphragm E4, a second lens E2, a third lens E3, an optical filter E5 and an optical lens E6. The first lens E1 is a convexo-convex lens with positive focal power. The second lens E2 is an image surface undercutting lens with negative focal power. The third lens E3 is a lens with negative power. In addition, at least one surface of the lenses is aspheric. In addition, the optical filter and each of the lenses are fixed and not movable.

The two surfaces of the first lens is S1 and S2. The surface of the diaphragm E4 is S3. The two surfaces of the second lens E2 are S4 and S5. The two surfaces of the third lens E3 are S6 and S7. The two surfaces of the optical filter E5 are S8 and S9. The surface of the optical lens E6 is S10.

TTL=3.45;f1=1.973;f2=−3.692;f3=−16.815;f=3.155
F2/f3=0.220
|f3|/f=5.329
TTL/f=1.094
System parameters: 1/5" stop value of sensor device: 2.8

TABLE 1

| Surface No. | Surface type | Radius of curvature R | Thickness D | Material | Effective diameter D | Cone factor K |
|---|---|---|---|---|---|---|
| Objective surface | Spherical surface | Infinity | Infinity | | Infinity | |
| S1 | Aspheric surface | 1.0925 | 0.4915 | 1.544/56.1 | 1.29 | −0.0808 |
| S2 | Aspheric surface | −70.6823 | −0.0103 | | 0.98 | −1.0000 |
| S3 (diaphragm) | Spherical surface | Infinity | 0.0554 | | 0.95 | |
| S4 | Aspheric surface | 6.9606 | 0.4077 | 1.633/23.3 | 0.98 | −104.5766 |
| S5 | Aspheric surface | 1.7219 | 0.5533 | | 1.06 | −35.3278 |
| S6 | Aspheric surface | 79.8557 | 0.9929 | 1.544/56.1 | 1.52 | −150.0000 |
| S7 | Aspheric surface | 8.2049 | 0.0635 | | 2.61 | −150.0072 |
| S8 | Spherical surface | Infinity | 0.3000 | 1.517/64.2 | 2.91 | |
| S9 | Spherical surface | Infinity | 0.5964 | | 3.05 | |
| Image surface | Spherical surface | Infinity | | | 3.50 | |

Table 2 shows the high-order term factors of aspheric surface for the lens with aspheric surface, i.e. A4, A6, A8, A10, A12, A14 and A16;

TABLE 2

| Surface no. | A4 | A6 | A8 | A10 | A12 | A14 | A16 |
|---|---|---|---|---|---|---|---|
| S1 | −3.1916E−02 | −5.5317E−01 | 3.5275E+00 | −1.3665E+01 | 1.8702E+01 | 3.0538E+00 | −2.0351E+01 |
| S2 | −3.9290E−01 | −9.2639E−01 | 1.2012E+01 | −4.3371E+01 | 8.3892E+01 | −9.3845E+01 | 2.5503E+01 |
| S4 | −3.0742E−01 | −1.0872E−01 | 6.3848E+00 | −8.8480E+00 | −1.4183E+01 | 9.7181E+00 | 3.5409E+01 |
| S5 | 8.0564E−01 | −2.2764E+00 | 5.8857E+00 | 7.3534E+00 | −2.9786E+01 | −5.3489E+01 | 1.7365E+02 |

Figure 11:
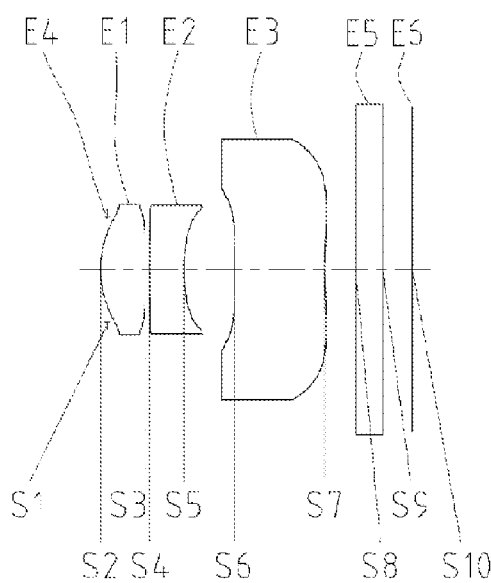
FIG. 11 is a schematic diagram of micro-lens according to Embodiment 3 of the present invention.

Embodiment 3:

In Embodiment 3, it can be seen from FIG. 11, from an object side to an image side, a diaphragm E4, a first lens E1, a second lens E2, a third lens E3, an optical filter E5 and an optical lens E6. The first lens E1 is a convexo-convex lens with positive focal power. The second lens E2 is an image surface undercutting lens with negative focal power. The third lens E3 is a lens with negative power. In addition, at least one surface of the lenses is aspheric. In addition, the optical filter and each of the lenses are fixed and not movable.

The surface of the diaphragm E4 is S1. The two surfaces of the first lens E1 are S2 and S3. The two surfaces of the second lens E2 are S4 and S5. The two surfaces of the third lens E3 are S6 and S7. The two surfaces of the optical filter E5 are S8 and S9. The surface of the optical lens E6 is S10.

TTL=3.280;f1=1.978;f2=−3.795;f3=−68.851;f=2.908
F2/f3=0.055
|f3|/f=23.674
TTL/f=1.128
System parameters: 1/5" stop value of sensor device: 2.8

Figure 16:
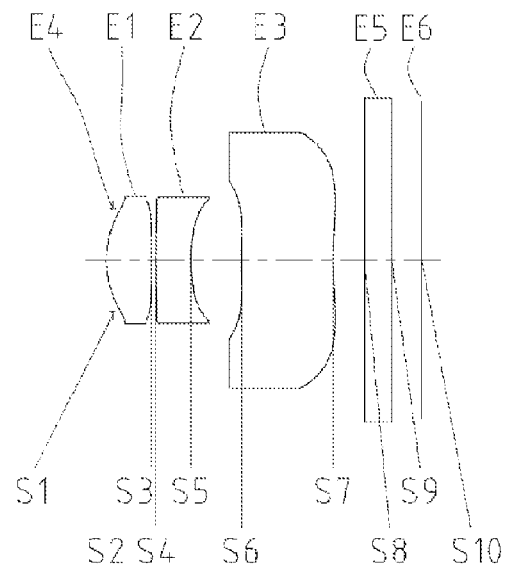
FIG. 16 is a schematic diagram of a micro-lens according to Embodiment 4 of the present invention.

Embodiment 4:

In Embodiment 4, it can be seen from FIG. 16, from an object side to an image side, a diaphragm E4, a first lens E1, a second lens E2, a third lens E3, an optical filter E5 and an optical lens E6. The first lens E1 is a convexo-convex lens with positive focal power. The second lens E2 is an image surface undercutting lens with negative focal power. The third lens E3 is a lens with negative power. In addition, at least one surface of the lenses is aspheric. In addition, the optical filter and each of the lenses are fixed and not movable.

The surface of the diaphragm E4 is S1. The two surfaces of the first lens E1 are S2 and S3. The two surfaces of the second lens E2 are S4 and S5. The two surfaces of the third lens E3 are S6 and S7. The two surfaces of the optical filter E5 are S8 and S9. The surface of the optical lens E6 is S10.

TTL=2.526;f1=1.438;f2=−2.636;f3=−13.207;f=2.313

F2/f3=0.200

TABLE 1

| Surface No. | Surface type | Radius of curvature R | Thickness D | Material | Effective diameter D | Cone factor K |
|---|---|---|---|---|---|---|
| Object surface | Spherical surface | Infinity | Infinity | | Infinity | |
| S1 (diaphragm) | Spherical surface | Infinity | −0.0473 | | 1.04 | |
| S2 | Aspheric surface | 1.0986 | 0.4662 | 1.544/56.1 | 1.16 | −0.1419 |
| S3 | Aspheric surface | −56.7807 | 0.0640 | | 1.25 | −0.9918 |
| S4 | Aspheric surface | 7.4372 | 0.3500 | 1.633/23.3 | 1.24 | −150.0132 |
| S5 | Aspheric surface | 1.7956 | 0.5245 | | 1.22 | −41.9900 |
| S6 | Aspheric surface | 5.5650 | 0.8989 | 1.544/56.1 | 1.62 | −51.3445 |
| S7 | Aspheric surface | 4.5713 | 0.0769 | | 2.64 | −72.6794 |
| S8 | Spherical surface | Infinity | 0.3000 | 1.517/64.2 | 2.90 | |
| S9 | Spherical surface | Infinity | 0.6000 | | 3.05 | |
| Image surface | Spherical surface | Infinity | | | 3.53 | |

The following table shows the high-order term factors of aspheric surface for the lens with aspheric surface, i.e. A4, A6, A8, A10, A12, A14 and A16

|f3|/f=5.709
TTL/f=1.093
System parameters: 1/7" stop value of sensor device: 2.8

TABLE 2

| Surface no. | A4 | A6 | A8 | A10 | A12 | A14 | A16 |
|---|---|---|---|---|---|---|---|
| S2 | −3.6230E−02 | −5.5173E−01 | 3.3107E+00 | −1.3617E+01 | 2.0467E+01 | 3.8472E+00 | −4.6429E+01 |
| S3 | −3.2553E−01 | −1.1342E+00 | 1.2057E+01 | −4.4379E+01 | 7.6953E+01 | −1.0658E+02 | 9.9102E+01 |
| S4 | −3.0113E−01 | 2.2662E−01 | 5.9535E+00 | −1.2949E+01 | −1.7077E+01 | 2.6912E+01 | 4.2127E+01 |
| S5 | 7.4380E−01 | −2.0414E+00 | 6.0696E+00 | 3.4664E+00 | −2.6144E+01 | −2.0554E+01 | 8.8742E+01 |
| S6 | −2.5755E−01 | −1.8546E−01 | 3.3779E−01 | −4.4709E−01 | 6.3705E−01 | −2.2996E+00 | 2.2551E+00 |
| S7 | 4.3196E−03 | −2.0242E−01 | 2.2161E−01 | −1.7093E−01 | 7.8372E−02 | −2.0180E−02 | 1.9540E−03 |

TABLE 1

| Surface No. | Surface type | Radius of curvature R | Thickness D | Material | Effective diameter D | Cone factor K |
|---|---|---|---|---|---|---|
| Object surface | Spherical surface | Infinity | Infinity | | Infinity | |
| S1 (diaphragm) | Spherical surface | Infinity | −0.0736 | | 0.83 | |
| S2 | Aspheric surface | 0.8006 | 0.3678 | 1.544/56.1 | 0.88 | −0.0489 |
| S3 | Aspheric surface | −35.9423 | 0.0411 | | 0.93 | −8.2475 |
| S4 | Aspheric surface | 6.4761 | 0.2722 | 1.633/23.3 | 0.92 | −79.7420 |
| S5 | Aspheric surface | 1.3150 | 0.4119 | | 0.89 | −41.3176 |
| S6 | Aspheric surface | 12.5467 | 0.7263 | 1.544/56.1 | 1.18 | −149.9227 |
| S7 | Aspheric surface | 4.4881 | 0.0510 | | 1.96 | −150.0476 |
| S8 | Spherical surface | Infinity | 0.2100 | 1.517/64.2 | 2.15 | |
| S9 | Spherical surface | Infinity | 0.4453 | | 2.24 | |
| Image surface | Spherical surface | Infinity | | | 2.57 | |

The following table shows the high-order term factors of aspheric surface for the lens with aspheric surface, i.e. A4, A6, A8, A10, A12, A14 and A16

TABLE 2

| Surface no. | A4 | A6 | A8 | A10 | A12 | A14 | A16 |
|---|---|---|---|---|---|---|---|
| S2 | −5.8425E−02 | −2.5664E+00 | 2.9430E+01 | −2.1580E+02 | 6.1894E+02 | 2.6078E+02 | −4.2313E+03 |
| S3 | −7.8296E−01 | −4.6172E+00 | 1.0544E+02 | −7.1192E+02 | 2.3183E+03 | −5.8970E+03 | 9.8028E+03 |
| S4 | −7.5473E−01 | 7.0837E−01 | 5.3090E+01 | −2.0130E+02 | −5.0178E+02 | 1.4423E+03 | 3.8467E+03 |
| S5 | 1.9856E+00 | −9.6872E+00 | 5.0360E+01 | 5.7780E+01 | −7.6240E+02 | −1.0896E+03 | 9.2642E+03 |
| S6 | −6.5080E−01 | −8.3578E−01 | 2.9997E+00 | −7.0566E+00 | 1.9556E+01 | −1.2656E+02 | 2.3237E+02 |
| S7 | −1.9130E−03 | −9.1078E−01 | 1.9359E+00 | −2.7589E+00 | 2.3410E+00 | −1.1161E+00 | 2.1403E−01 |

Figure 21:
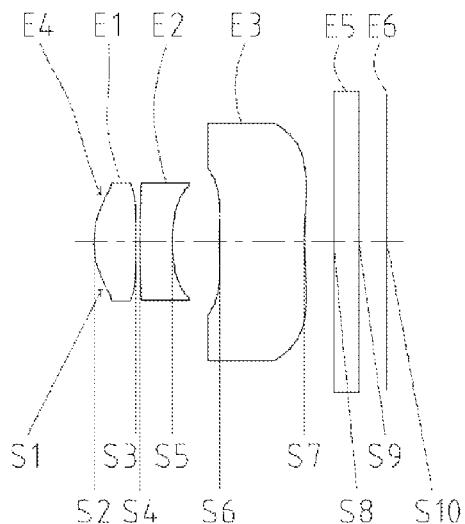
FIG. 21 is a schematic diagram of a micro-lens according to Embodiment 5 of the present invention.

Embodiment 5:

In Embodiment 5, it can be seen from FIG. 21, from an object side to an image side, a diaphragm E4, a first lens E1, a second lens E2, a third lens E3, an optical filter E5 and an optical lens E6. The first lens E1 is a convexo-convex lens with positive focal power. The second lens E2 is an image surface undercutting lens with negative focal power. The third lens E3 is a lens with negative power. In addition, at least one surface of the lenses is aspheric. In addition, the optical filter and each of the lenses are fixed and not movable.

The surface of the diaphragm E4 is S1. The two surfaces of the first lens E1 are S2 and S3. The two surfaces of the second lens E2 are S4 and S5. The two surfaces of the third lens E3 are S6 and S7. The two surfaces of the optical filter E5 are S8 and S9. The surface of the optical lens E6 is S10.

TTL=2.052; f1=1.165; f2=−2.042; f3=−311.900; f=1.767

F2/f3=0.007

|f3|/f=176.546

TTL/f=1.161

System parameters: 1/9" stop value of sensor device: 2.8

TABLE 1

| Surface No. | Surface type | Radius of curvature R | Thickness D | Material | Effective diameter D | Cone factor K |
|---|---|---|---|---|---|---|
| Object surface | Spherical surface | Infinity | Infinity | | Infinity | |
| S1 (diaphragm) | Spherical surface | Infinity | −0.1100 | | 0.74 | |
| S2 | Aspheric surface | 0.6391 | 0.3150 | 1.544/56.1 | 0.74 | 0.0239 |
| S3 | Aspheric surface | −124.8339 | 0.0313 | | 0.76 | 0.0000 |
| S4 | Aspheric surface | −242.2065 | 0.2519 | 1.633/23.3 | 0.75 | 0.0000 |
| S5 | Aspheric surface | 1.3127 | 0.2507 | | 0.75 | −92.9712 |
| S6 | Aspheric surface | 4.0783 | 0.7173 | 1.544/56.1 | 0.90 | −302.2666 |
| S7 | Aspheric surface | 3.7354 | 0.0904 | | 1.60 | −1.0978 |
| S8 | Spherical surface | Infinity | 0.1450 | 1.517/64.2 | 1.72 | |
| S9 | Spherical surface | Infinity | 0.2500 | | 1.79 | |
| Image surface | Spherical surface | Infinity | | | 2.00 | |

The following table shows the high-order term factors of aspheric surface for the lens with aspheric surface, i.e. A4, A6, A8, A10, A12, A14 and A16

TABLE 2

| Surface no. | A4 | A6 | A8 | A10 | A12 | A14 | A16 |
|---|---|---|---|---|---|---|---|
| S2 | −8.2511E−02 | −5.9587E+00 | 1.2153E+02 | −1.2935E+03 | 5.2365E+03 | 3.5032E+03 | −5.9422E−04 |
| S3 | −1.4985E+00 | −1.1393E+01 | 4.2220E+02 | −4.1802E+03 | 2.1040E+04 | −7.6193E+04 | 1.6856E+05 |
| S4 | −1.4843E+00 | −2.1264E+00 | 2.1384E+02 | −9.7651E+02 | −3.9752E+03 | 1.6023E+04 | 5.3550E+04 |
| S5 | 3.3612E+00 | −2.8636E+01 | 1.7548E+02 | 5.2946E+02 | −5.7721E+03 | −1.7246E+04 | 1.5843E+05 |
| S6 | −1.0203E+00 | −9.8327E−01 | 9.1000E+00 | −6.4808E+01 | 2.1297E+02 | −1.3747E+03 | 4.0749E+03 |
| S7 | −8.8700E−03 | −2.1261E+00 | 7.5889E+00 | −1.6825E+01 | 2.0849E+01 | −1.3729E+01 | 3.6466E+00 |

Figure 2:
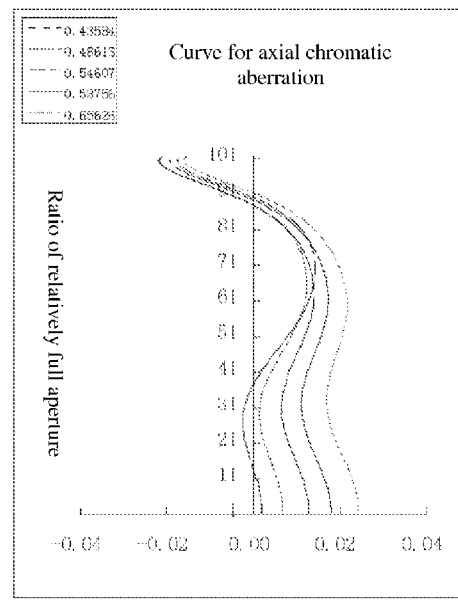
FIG. 2 illustrates axial chromatic aberration (mm) according to Embodiment 1.
Figure 3:
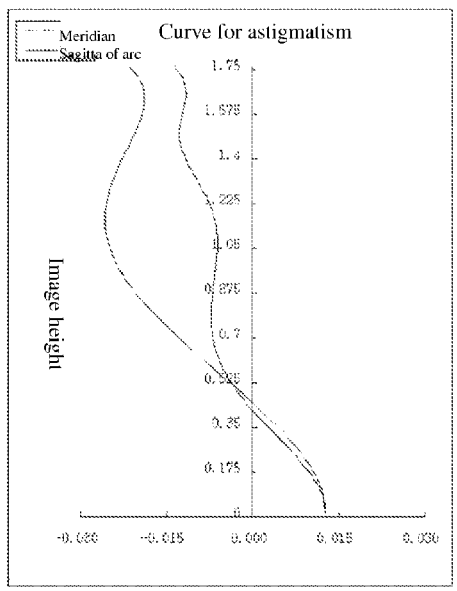
FIG. 3 illustrates astigmatism (mm) according to Embodiment 1.
Figure 4:
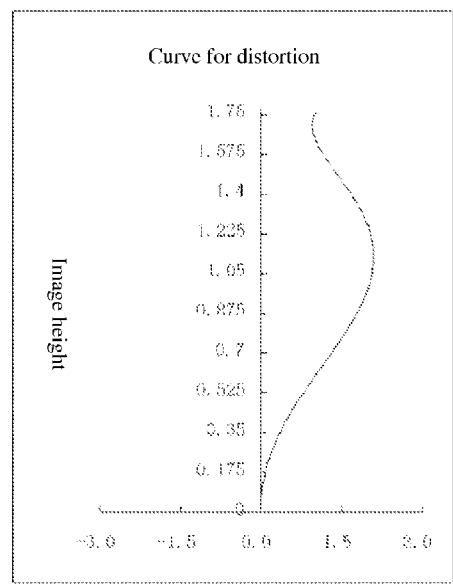
FIG. 4 illustrates distortion (%) according to Embodiment 1.
Figure 5:
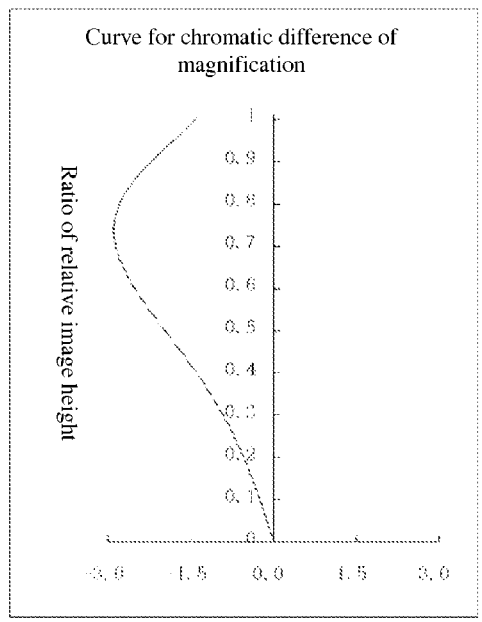
FIG. 5 illustrates chromatic difference of magnification (μm) according to Embodiment 1.

FIG. 2 illustrates axial chromatic aberration (mm) according to Embodiment 1; FIG. 3 illustrates astigmatism (mm) according to Embodiment 1; FIG. 4 illustrates distortion (%) according to Embodiment 1; FIG. 5 illustrates chromatic difference of magnification (μm) according to Embodiment 1.

Figure 7:
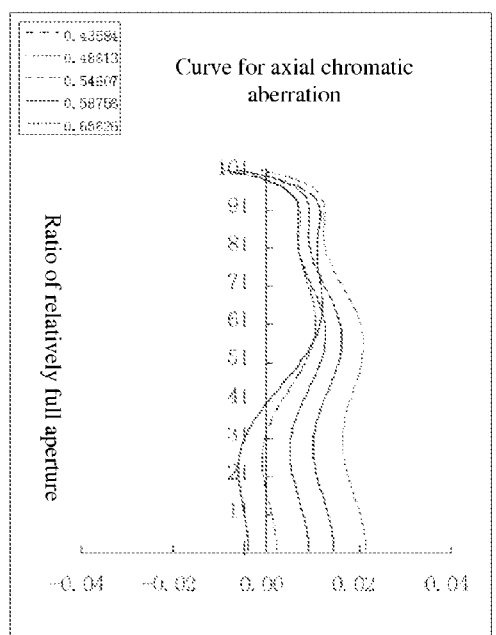
FIG. 7 illustrates axial chromatic aberration (mm) according to Embodiment 2.
Figure 8:
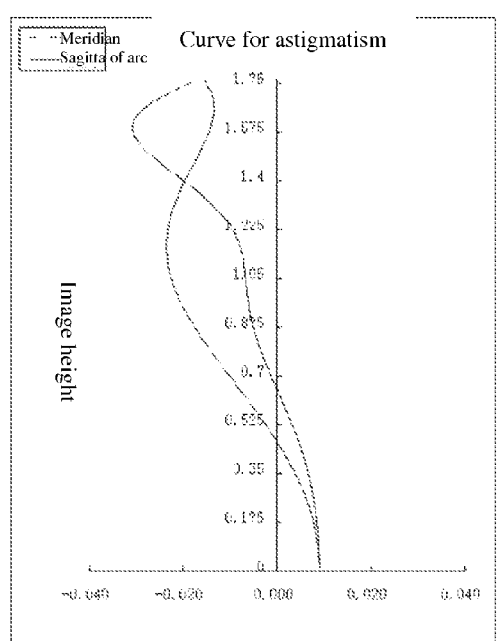
FIG. 8 illustrates astigmatism (mm) according to Embodiment 2.
Figure 9:
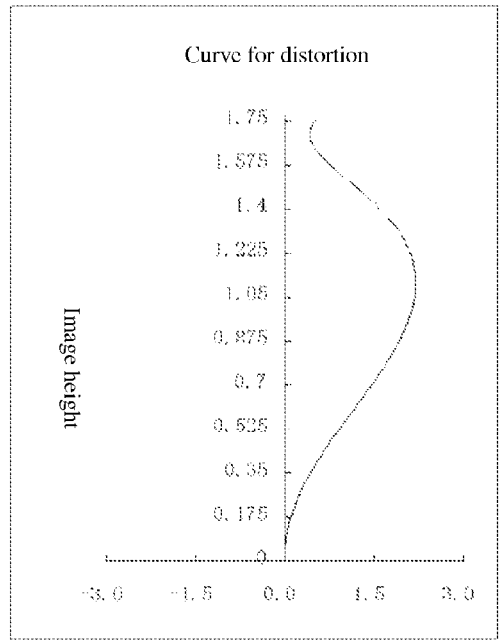
FIG. 9 illustrates distortion (%) according to Embodiment 2.
Figure 10:
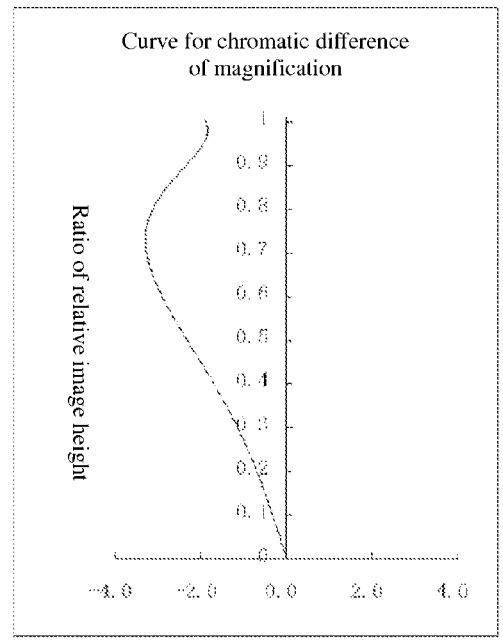
FIG. 10 illustrates chromatic difference of magnification (μm) according to Embodiment 2.

FIG. 7 illustrates axial chromatic aberration (mm) according to Embodiment 2; FIG. 8 illustrates astigmatism (mm) according to Embodiment 2; FIG. 9 illustrates distortion (%) according to Embodiment 2; FIG. 10 illustrates chromatic difference of magnification (μm) according to Embodiment 2.

Figure 12:
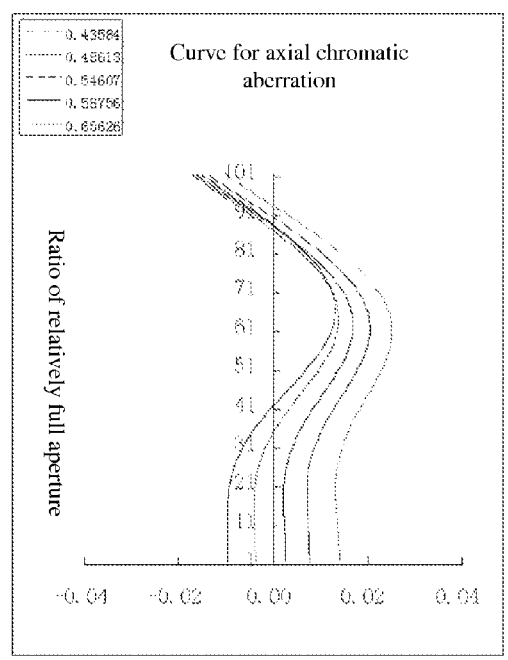
FIG. 12 illustrates axial chromatic aberration (mm) according to Embodiment 3.
Figure 13:
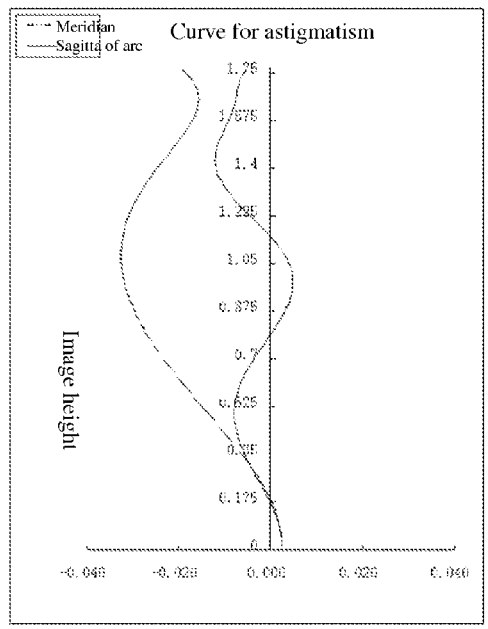
FIG. 13 illustrates astigmatism (mm) according to Embodiment 3.
Figure 14:
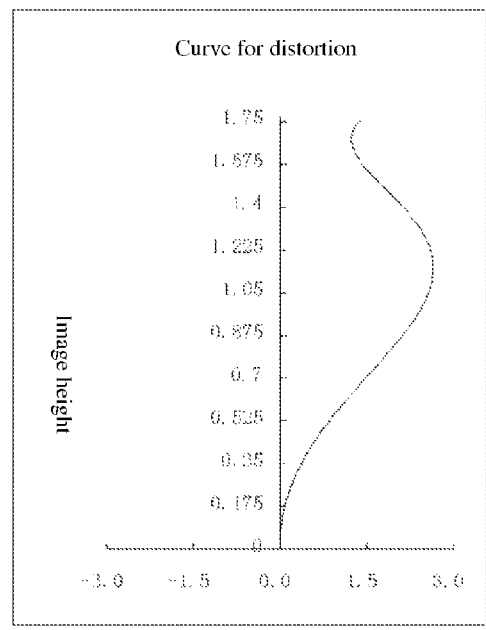
FIG. 14 illustrates distortion (%) according to Embodiment 3.
Figure 15:
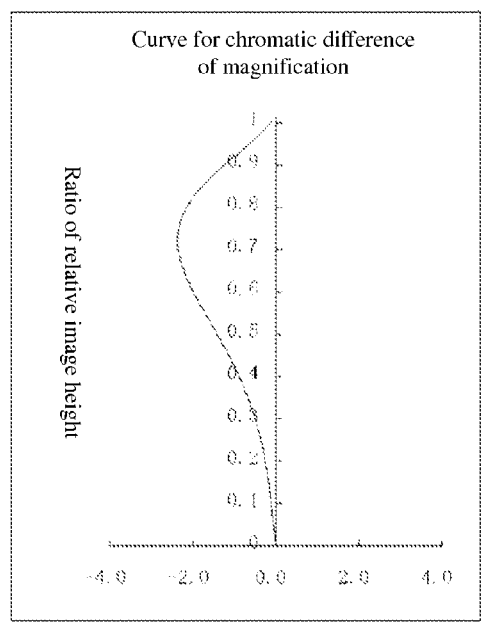
FIG. 15 illustrates chromatic difference of magnification (μm) according to Embodiment 3.

FIG. 12 illustrates axial chromatic aberration (mm) according to Embodiment 3; FIG. 13 illustrates astigmatism (mm) according to Embodiment 3; FIG. 14 illustrates distortion (%) according to Embodiment 3; FIG. 15 illustrates chromatic difference of magnification (μm) according to Embodiment 3.

Figure 17:
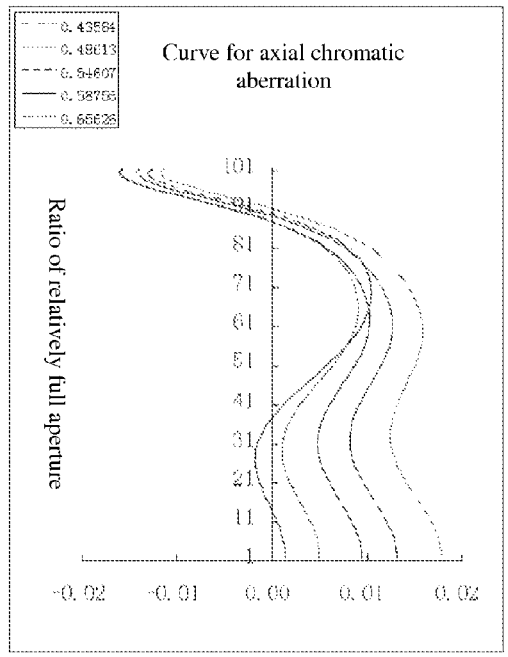
FIG. 17 illustrates axial chromatic aberration (mm) according to Embodiment 4.
Figure 18:
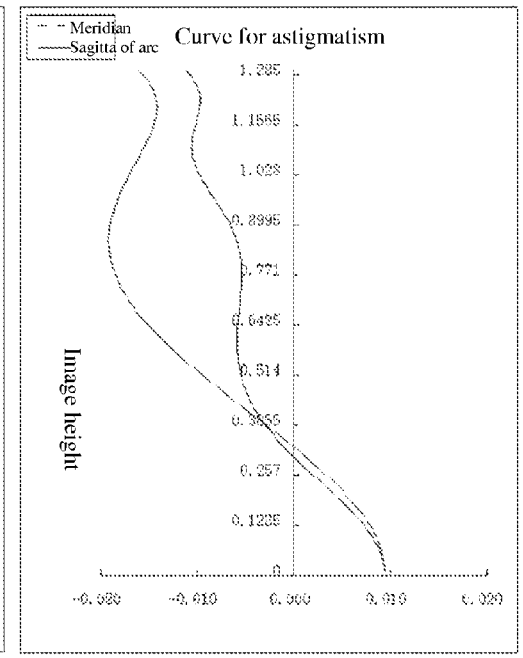
FIG. 18 illustrates astigmatism (mm) according to Embodiment 4.
Figure 19:
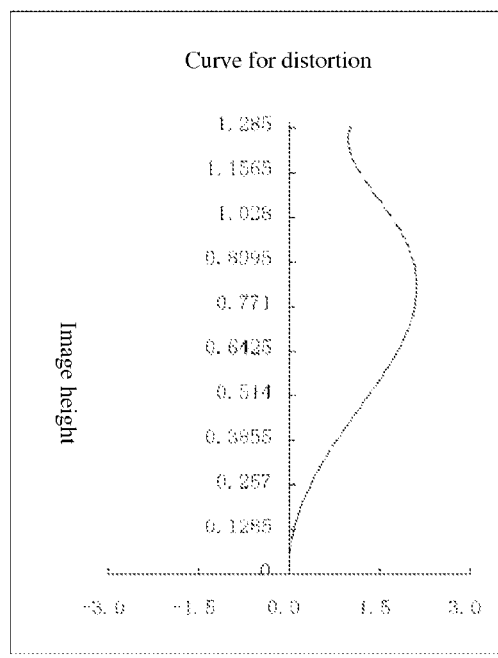
FIG. 19 illustrates distortion (%) according to Embodiment 4.
Figure 20:
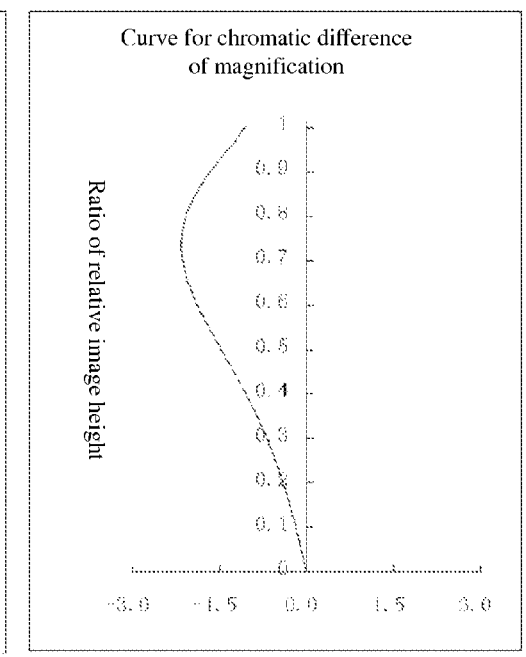
FIG. 20 illustrates chromatic difference of magnification (μm) according to Embodiment 4.

FIG. 17 illustrates axial chromatic aberration (mm) according to Embodiment 4; FIG. 18 illustrates astigmatism (mm) according to Embodiment 4; FIG. 19 illustrates distortion (%) according to Embodiment 4; FIG. 20 illustrates chromatic difference of magnification (μm) according to Embodiment 4.

Figure 22:
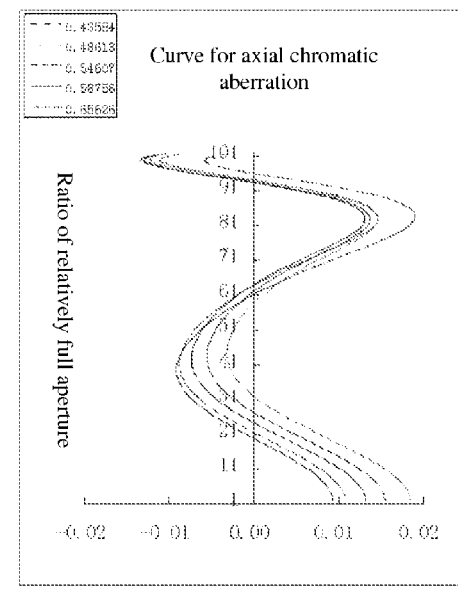
FIG. 22 illustrates axial chromatic aberration (mm) according to Embodiment 5.
Figure 23:
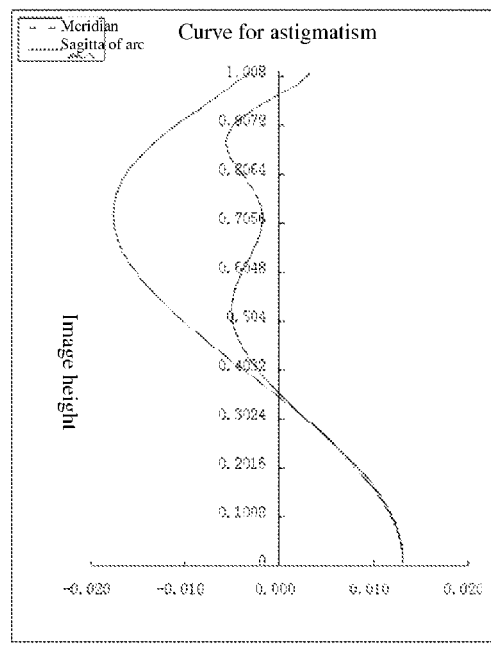
FIG. 23 illustrates astigmatism (mm) according to Embodiment 5.
Figure 24:
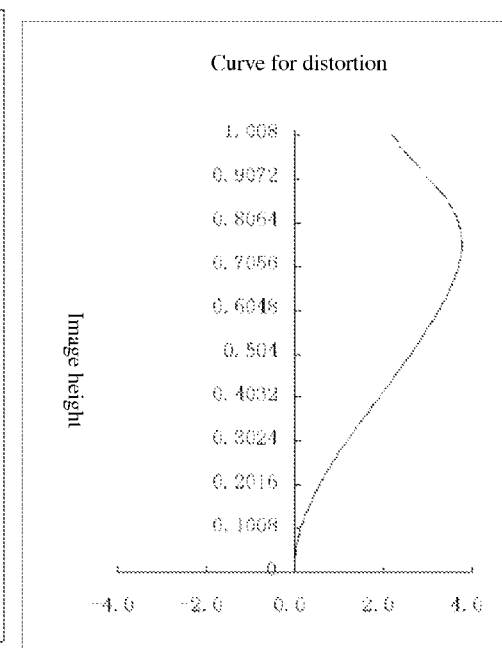
FIG. 24 illustrates distortion (%) according to Embodiment 5.
Figure 25:
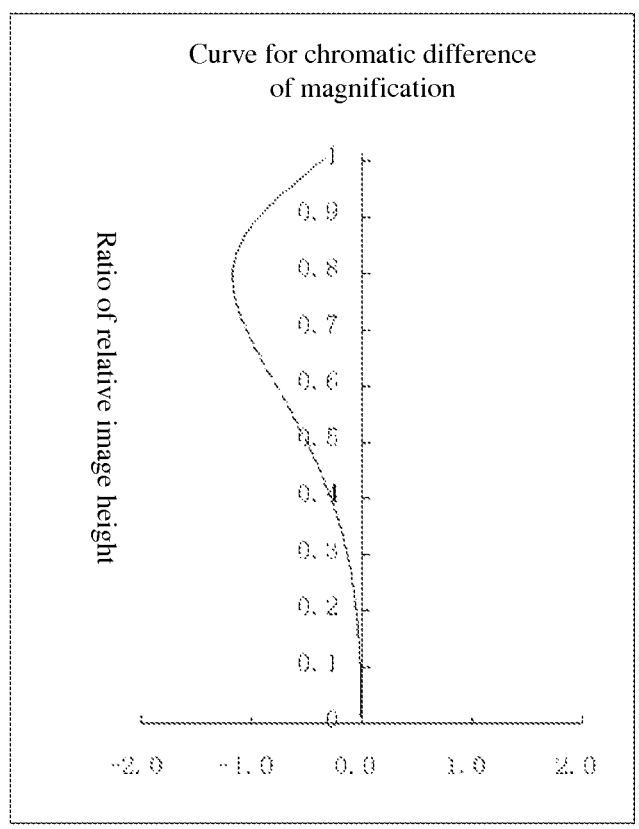
FIG. 25 illustrates chromatic difference of magnification (μm) according to Embodiment 5.

FIG. 22 illustrates axial chromatic aberration (mm) according to Embodiment 5; FIG. 23 illustrates astigmatism (mm) according to Embodiment 5; FIG. 24 illustrates distortion (%) according to Embodiment 5; FIG. 25 illustrates chromatic difference of magnification (μm) according to Embodiment 5.

Based on axial chromatic aberration, astigmatism, distortion and chromatic difference of magnification of each Embodiment, it can be seen that the optical lens of the present invention has good optical quality.

Based on the Micro-lenses, the principle and specific mode of execution for this invention are described. However, as per the above instructions herein, the technicians in this field could make various improvements and transformations on the basis of the above Embodiments. These improvements and transformations shall be all within the protective range of this invention. The technicians in this field shall understand that the said description is only used for interpretation of the purpose of this invention rather than limitation thereof. The protective range of this invention shall be limited by the claims and equivalent thereof.

We claim:

1. A micro-lens, comprising a first lens, a second lens and a third lens, wherein the first lens is a convexo-convex lens with positive focal power; the second lens is a lens having a concave image-side surface with negative focal power; and the third lens is a lens with negative focal power, and wherein at least one surface of the surfaces of the first lens, the second lens and the third lens is aspheric, and
   wherein for the first lens, |R1|<|R2|, wherein R1 is a radius of curvature of an object-side surface of the first lens, and R2 is a radius of curvature of an image-side surface of the first lens, and
   an object-side surface of the second lens is convex.

2. A micro-lens as claimed in claim 1, wherein
0<f2/f3<1.5
   where f2 is the focal length of the second lens, and f3 is the focal length of the third lens.

3. A micro-lens as claimed in claim 1, wherein
|f3|/f>2.0
   where |f3| is the absolute value of the focal length of the third lens, and f is the focal length of whole system.

4. A micro-lens as claimed in claim 1, wherein
0.8<TTL/f<2.5
   where TTL is the distance between the central point of object side of the first lens and imaging surface; and f is the focal length of whole system.

5. A micro-lens as claimed in claim 1, further comprising a diaphragm, and the diaphragm is between the first lens and an object.

6. A micro-lens as claimed in claim 1, further comprising a diaphragm, and the diaphragm is between the first lens and the second lens.

7. A micro-lens as claimed in claim 1, wherein the positions of each of the first lens, the second lens and the third lens are fixed.

\* \* \* \* \*